United States Patent [19]

Usui et al.

[11] Patent Number: 4,631,112

[45] Date of Patent: Dec. 23, 1986

[54] SURFACE-TREATED ALUMINUM ALLOY SUBSTRATES FOR MAGNETIC DISKS

[75] Inventors: Eiki Usui; Masahiro Kawaguchi, both of Mooka, Japan

[73] Assignee: Kabushiki Kaisha Kobe Seiko Sho, Kobe, Japan

[21] Appl. No.: 724,639

[22] Filed: Apr. 18, 1985

[30] Foreign Application Priority Data

May 1, 1984 [JP] Japan .................................. 59-88199

[51] Int. Cl.$^4$ ........................ B44C 1/22; C03C 15/00; C03C 25/06
[52] U.S. Cl. .................................... 156/644; 156/655; 156/667; 204/35.1; 204/42; 252/79.2
[58] Field of Search ............... 156/644, 651, 655, 656, 156/659.1, 665, 667; 252/79.2, 79.4, 79.5; 204/38.3, 42, 35.1

[56] References Cited

U.S. PATENT DOCUMENTS 3,626,233  12/1971  Wainer et al. ................. 156/644 X
4,251,330   2/1981  Sheasby et al. ................ 204/35 N

FOREIGN PATENT DOCUMENTS 1297501  1/1970  United Kingdom .
1532235  7/1975  United Kingdom .

OTHER PUBLICATIONS

UK Patent Application No. GB 2142 043 A (Unexamined Publication).

*Primary Examiner*—William A. Powell
*Attorney, Agent, or Firm*—Oblon, Fisher, Spivak, McClelland, & Maier

[57] ABSTRACT

A method for treating surfaces of magnetic disk substrates of aluminum alloy with an anodic oxide film on the surfaces thereof, the method comprising: dissolving part of the anodic oxide film by an etching treatment to broaden micro pores of the anodic oxide film to a diameter greater than 170 Å.

7 Claims, No Drawings

SURFACE-TREATED ALUMINUM ALLOY SUBSTRATES FOR MAGNETIC DISKS

BACKGROUND OF THE INVENTION

1. Field of the Invention

This invention relates to surface treatment of magnetic disk substrates, and more particularly to surface-treated aluminum alloy substrates for magnetic disks, with an oxide film free of defects such as cracks even in a high temperature heat treatment.

2. Description of the Prior Art

Heretofore, aluminum alloy sheets of a predetermined thickness which are obtained by machining and precision polishing are mainly resorted to as substrates for magnetic disks. The magnetic disks which are currently in use are mostly of the so-called coated type which is treated with chromate for improving deposition and corrosion resistance and coated with fine magnetic particles as a magnetic medium.

Recently, the magnetic memory disks have a trend toward a higher recording density, and for this purpose it is necessary to reduce the thickness of the magnetic medium and the gap space (hereinafter referred to as "spacing" for brevity) between a magnetic head and the magnetic medium.

Accordingly, the substrates for magnetic disks are required to meet the following conditions.

(1) The substrate surfaces after polishing should be of high accuracy to keep a uniform spacing and stablize the memory characteristics.

(2) The substrate surfaces should have high hardness and abrasive resistance in the case of contact-start/stop type disks.

(3) Substrates for $\gamma$-$Fe_2O_3$ media by a sputtering process or the like should be free of changes in the above-mentioned characteristics even after a heating condition of 300°-400° C., namely, should have high thermal resistance in heat treatments.

The conventional coated type disks with a relatively thick magnetic medium layer of 1-2.5 $\mu$m and a large spacing of 1-2 $\mu$m, employing substrates which are produced by cutting or polishing aluminum alloy of AA Standard 5086, and direct chromate treatment, satisfy the requirement (1) and involve no problem in particular with regard to the requirement (2). However, where higher recording density is aimed at, the target values for the thickness of magnetic medium and the spacing are smaller than 0.5 $\mu$m and 0.4 $\mu$m, respectively, though the existing substrates produced by cutting and polishing aluminum alloy sheets fail to guarantee the required surface accuracy as well as the required hardness and abrasive resistance.

In order to solve these problems of magnetic disks of high recording density, attempts have been made to harden the disk surface by forming electroless plated layer of Ni—P or an anodic oxide film on the surface of an aluminum alloy substrate, followed by mirror polishing and formation of a magentic film.

In the former case, 20-50 $\mu$m thick Ni—P layer is plated on an aluminum alloy substrate and the plated surface is polished to meet the above-mentioned requirements (1) and (2). However, since direct plating on aluminum alloy is difficult, there arises a necessity for a scrupulous foundation treatment which makes the process complicate, and the electroless Ni—P plated layer which undergoes crystallization under heated condition above 200° C. and as a result picks up magnetic property which is unsuitable as substrates for magnetic disks.

In the latter case, the anodic oxide film which is formed on an aluminum alloy substrate is polished to a thickness of 1-10 $\mu$m to obtain the above-mentioned properties by a method as described, for example, in Japanese Patent Publication No. 53-037203. This method can meet the requirement (1) but normally involves a heat treatment at 350°-400° C. in the magnetic film forming process, in which the anodic oxide film is susceptible to cracks due to a difference in thermal expansion between the anodic oxide film and aluminum alloy unles the oxide film thickness is greater than 3 $\mu$m. In addition, when polishing anodic oxide films to a thickness smaller than 3 $\mu$m, it is extremely difficult to control the anodic oxide films on the entire surfaces of substrates to a thickness smaller than 3 $\mu$m by polishing since the mirror-finished aluminum alloy substrates contain thickness irregularities greater than 3-5 $\mu$m. On the other hand, if the spacing is minimized, there arises a problem that the magnetic head will hit upon and get into the substrate.

Although efforts have been made to solve the foregoing problems by increasing the thickness of the anodic oxide film, conventional methods failed to produce practically satisfactory magnetic disks due to the cracks which occur in the heat treatment of magnetic films. In this connection, Japanese Laid-Open Patent Application No. 58-016063 proposes a method of forming on an aluminum substrate a porous anodic oxide film with an allowance for polishing, washing the substrate with water, immediately polishing the oxide film to a mirror surface and into a thickness smaller than 8 $\mu$m, washing the substrate with water again, and, after dehydration by a centrifugal dehydrator or by immersion in a hydrophilic organic solvent such as ethyl alcohol or the like for a water replacing treatment, drying at a temperature above 100° C. to remove moisture completely from pores of the oxide film, storing the substrate in dried state until manufacture of magnetic disk. That is to say, water which is trapped in pores of the porous oxide film is completely removed to prevent pore sealing which would give rise to cracks upon heating in the magnetic film forming stage. In order to prevent sealing of the pores, the substrate requires strict control of dehydration not only during storage but also in the manufacturing process, and therefore invites complication of the manufacturing process.

SUMMARY OF THE INVENTION

In view of the above-mentioned drawbacks or problems of the conventional magnetic disk substrates, the inventors have conducted an extensive research in search for a solution to these problems and found that heat resistance of anodic oxide film on aluminum alloy substrates can be improved significantly by an dissolution treatment with an acidic or alkaline aqueous solution, arriving at a method for treating surfaces of magnetic disk substrates to form thereon a thick anodic oxide film with heat resistance free of surface cracks even under high temperature heating condition.

The method of treating surfaces of magnetic disk surfaces according to the invention is characterized by subjecting to an dissolution treatment an aluminum alloy substrate with an anodic oxide film on the surface thereof, dissolving part of the anodic oxide film and broadening the micro pores to a diameter larger than 170 Å to enhance the thermal resistance.

Namely, the magnetic disk substrate which has undergone the surface treatment according to the method of the invention is free of cracking even when an oxide film with a thickness greater than 10 μm is heated to a temperature higher than 250° C., different from the film of Japanese Patent Publication No. 53-037203 which relies on the anodic oxidation treatment alone. Besides, the substrates according to the invention permits drying at normal temperature after the film-forming or polishing stage and has no possiblities of cracking even if subjected to high temperature in a subsequent heating stage, in contrast to the anodic oxide film of Japanese Laid-Open Patent Application No. 58-016063 which requires storage in dried state in addition to perfect dehydration before and after polishing for the prevention of pore sealing. Further, although the film thickness which is free of cracking is smaller than 3 μm at most under the heating condition of 350° C.×2 hrs in the case of Japanese Patent Publication No. 53-037203 and smaller than 8 μm at most under heating at 400° C. in the case of Japanese Laid-Open Patent Application No. 58-016063, the magnetic disk substrate according to the present invention is unsusceptible to cracking even when the film thickness is greater than 10 μm.

The method of treating the surfaces of magnetic disk substrates according to the invention (hereinafter referred to simply as "method of the invention") includes the steps as described in detail hereinafter.

The procedure of forming an anodic oxide film on an aluminum alloy substrate in the method of the invention is same as in the conventional anodic oxidation process, namely, direct or alternate current or superposed direct and alternate currents or pulse current is passed through an aluminum alloy substrate in a solution containing sulfuric acid, oxalic acid, phosphoric acid, sulfamic acid, benzenesulfonic acid, malonic acid, tartaric acid or the like as a major component or in an aqueous solution of more than two of these acids, thereby forming an anodic oxide film layer on the aluminum alloy substrate.

The condition of the anodic oxidation treatment largely varies depending upon the kind of electrolyte to be used, but normally the concentration of electrolyte is in the range of 1–70 wt%, its temperature is in the range of −5°–70° C., the current density is in the range of 0.3–20 A/dm$^2$, the voltage is in the range of 1–110 V.

Among the above-mentioned anodic oxidation treatments, it is preferred to employ anodic oxidation in an electrolyte consisting of an aqueous solution which contains sulfuric or oxalic acid as a major component.

With regard to the etching treatment in the method of the present invention, the aluminum alloy substrate is immersed in an acidic or alkaline aqueous solution after formation of the anodic oxide film. The acidic or alkaline aqueous solution may be of any kind as long as it basically has an ability of dissolving the anodic oxide film. For example, the substrate may be continuedly immersed in a solution of sulfuric acid, oxalic acid or sulfamic acid or the like which has served as an electrolyte for the formation of the anodic oxide film.

The condition of dissolving anodic oxide film varies diversely depending upon the kind of the aqueous solution to be used, but normally the concentration of solution is in the range of 0.5–90 wt%, its temperature is in the range of 0° C.–boiling point and the time period of immersion is in the range of 30 sec to 1 hr.

Of the above-mentioned aqueous solutions, it is preferred to employ an aqueous solution containing sulfuric acid, oxalic acid or malonic acid as a major component or components. Though the micro pores in the anodic oxide film are widened by the above-described dissolution treatment, it is necessary to enlarge the pore diameters to a value greater than 170 Å, preferably greater than 200 Å, from a standpoint of improving the heat resistance.

The diameters of micro pores in the anodic oxide film vary depending upon the condition of the anodic oxidation treatment. For instance, in a case using a sulfuric acid bath for the anodic oxidation treatment, the pore diameters are in the range of 100–200 Å and about 150 Å under a standard treatment condition where the electrolytic potential is 12–15 V. In a case using an oxalic acid bath, the micro pore diameters are in the range of 100–500 Å and normally in the range of 290–360 Å under a standard condition where the electrolytic potential is 30–36 V. Accordingly, the micro pores after an anodic oxidation treatment generally have a diameter larger than 170 Å. The oxide films with such mirco pores are unsatisfactory in thermal resistance, so that it is essential to dissolve part of the anodic oxide film by the etching treatment. In this regard, it is to be noted that an insufficient amount of dissolution will have little effect on the enlargement of the micro pore diameters and fail to increase the thermal resistance to any significant degree as compared with that of the anodic oxide film before the etching treatment. Consequently, even in the case of an anodic oxide film formed in a sulfuric acid bath, it is also necessary to broaden the micro pores to a diameter larger than 170 Å by an etching treatment, which enlarges the micro pore diameters by more than 10%, preferably by more than 20% in terms of an enlargement rate (%) (=(micro pore diameter after film dissolving treatment—micro pore diameter immediately after an anodic oxidation treatment)×100/micro pore diameter immediately after anodic oxidation treatment).

However, the strength of the oxide film itself is lowered if it is dissolved to an excessive degree, so that the enlargement rate of the micro pores desirably should not exceed 150%.

The anodic oxide film on the magnetic disk substrate which is obtained by the surface treating method of the present invention has extremely high resistance to thermal cracks, immune from cracks or other damages of the film even if heated at 360° C. for 3 hours.

The method of the present invention will be illustrated more particularly by the following example.

EXAMPLES

The specimens used in the following example of the invention as well as in the comparison example were mirror-finished disk-like aluminum alloy sheets containng 0.01 wt% of Fe, 0.01 wt% of Si, 4.5 wt% of Mg and the balance of Al and inevitable impurities.

EXAMPLE 1

The specimens were subjected to electrolysis for 50 min. in an aqueous solution of 15% $H_2SO_4$ of 20° C. with a current density of 1 A/dm$^2$ to form thereon an approximately 14 μm thick anodic oxide film, and thereafter part of the anodic oxide film was dissolved by immersing the specimens in an aqueous solution of 10% $H_2SO_4$ of 40° C. for 5 min.

Then, the skin films of the aluminum alloy substrates were polished to mirror surface and to a thickness of 12 μm.

The resulting aluminum alloy substrates were heated at 360° C. for 3 hours to check for occurrence of cracking, but no crack was observed. The micro pores of the anodic oxide films had a diameter of 190 Å after the partial dissolution by the etching treatment, and their rate of enlargement was 26.7%.

EXAMPLE 2

The specimens were subjected to electrolysis for 30 min. in an aqueous solution of 5% oxalic acid at 30° C. and a current density of 3 A/dm$^2$ to form thereon an anodic oxide film of about 26 μm in thickness, and thereafter the substrates were immersed in an aqueous solution of 15% $H_2SO_4$ of 40° C. for 30 min to dissolve part of the anodic oxide film.

Then, the skin films of the aluminum alloy substrates were polished to mirror surface and to a thickness of 24 μm.

The aluminum alloy substrates thus obtained were heated at 360° C. for 3 hours to check for occurrence of cracks, but no cracking was observed. The micro pores had a diameter of 600 Å after the partial dissolution by the etching treatment, and their rate of enlargement was 66.7%.

EXAMPLE 3

The specimens were subjected to electrolysis for 45 min. in a mixed aqueous solution of 5% oxalic acid and 0.2% $H_2SO_4$ at 35° C. and a current density of 2 A/dm$^2$ to form thereon an anodic oxide film of about 25 μm in thickness, and thereafter the substrates were immersed in an aqueous solution of 10% malonic acid at 80° C. for 5 min to dissolve part of the anodic oxide film.

Then, the skin films of the aluminum alloy substrates were polished to mirror surface and to a thickness of 23 μm.

The aluminum alloy substrates thus obtained were heated at 360° C. for 3 hours to check for occurrence of cracks, but no cracking was observed. The micro pores had a diameter of 650 Å after the partial dissolution by the etching tretment, and their rate of enlargement was 124.1%.

COMPARISON EXAMPLE

The specimens were subjected to electrolysis for 50 min. in an aqueous solution of 15% $H_2SO_4$ at 20° C. with current density of 1 A/dm$^2$ to form thereon an anodic oxide film of 14 μm in thickness.

Thereafter, the skin films of the substrates were polished to mirror surface and to a thickness of 12 μm.

The aluminum alloy substrates thus obtained were heated at 360° C. for 3 hours for a crack test, in which cracks occurred on almost the entire surfaces of the substrates. The micro pore diameters were 150 Å in this case.

Table 1 shows the results of crack tests in which anodic oxide films of the aluminum alloy substrates prepared according to the foregoing Examples 1 and 2 and the Comparison Example were heated at 350° C. for 3 hours after polishing to various thicknesses.

As clear from Table 1, the magnetic disc substrates of Examples 1 and 2 which employed the surface treating method of the invention were free of cracks in various anodic oxide film thicknesses, in contrast to the substrates of Comparison Example which all suffered from cracking except for 3 μm thick anodic oxide films at the heating temperature of 350° C. These test results show that the magnetic disk substrates according to the invention are far superior to in thermal resistance.

TABLE 1

| Film Thickness (μm) | Example 1 | Example 2 | Comparison Ex. |
|---|---|---|---|
| 3 | O | O | O |
| 6 | O | O | X |
| 9 | O | O | X |
| 12 | O | O | X |
| 15 | — | O | — |
| 18 | — | O | — |
| 21 | — | O | — |
| 24 | — | O | — |

"O": Not cracked.
"X": Cracked.

It will be appreciated from the foregoing description that the magnetic disk substrate surface treating method of the present invention is particularly suitable for application to substrates for magnetic disks of high recording density for preventing cracks of anodic oxide films in heat treatment of high temperature.

What is claimed is:

1. A method for treating surfaces of magnetic disk substrates of aluminum alloy with an anodic oxide film on the surfaces thereof to render said surfaces heat resistant and substantially free from cracking, which comprises dissolving a portion of said anodic oxide film by an etching treatment to broaden the micropores of said anodic oxidation film to a diameter having an enlargement rate in the range of 10–150%, based upon the micropore diameter before said etching treatment but after anodic oxidation, provided that the enlarged pore diameter is at least about 170 Å.

2. The method of claim 1, wherein said anodic oxide film is etched in an acidic or alkaline aqueous solution capable of dissolving said film.

3. The method of claim 2, wherein said aqueous solution contains at least one member selected from the group consisting of sulfuric acid, oxalic acid, sulfamic acid, malonic acid and phosphoric acid.

4. The method of claim 1, wherein said anodic oxide film is etched in an aqueous solution in a concentration in the range of 0.5–90 wt%.

5. The method of claim 1, wherein said anodic oxide film is etched in an aqueous solution at a temperature in the range of 0° C.–boiling point.

6. The method of claim 1, wherein said anodic oxide film is immersed in an aqueous solution for a time period of 30 seconds to 1 hour.

7. The method of claim 1, wherein the micropores of said anodic oxidation film are broadened to a diameter having an enlargement rate in the range of 20–150%.

* * * * *